No. 854,704. PATENTED MAY 21, 1907.
W. J. RICHARDS.
DYNAMO ELECTRIC MACHINE.
APPLICATION FILED AUG. 27, 1906.
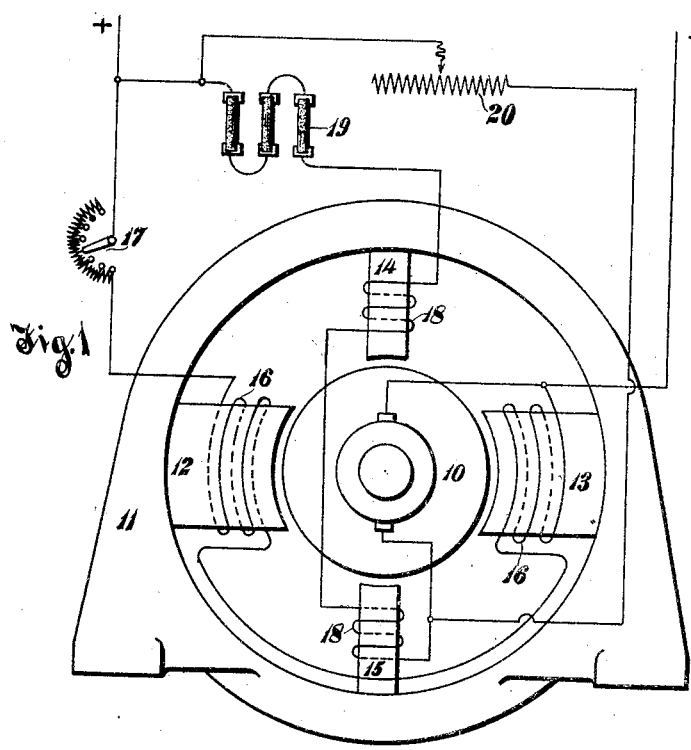
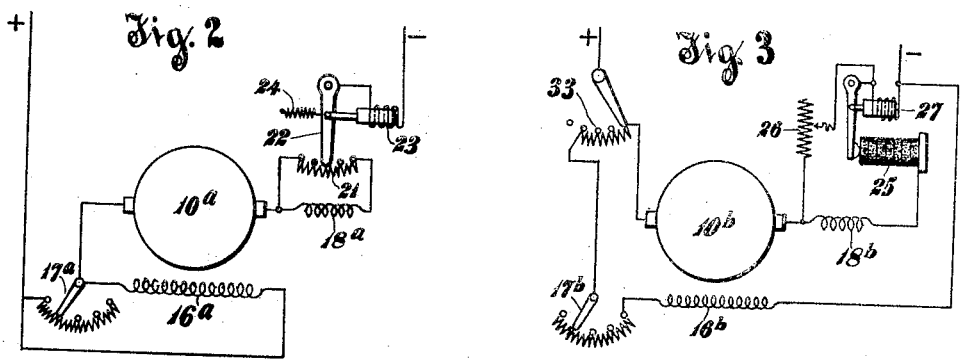
Witnesses
Inventor
Walter J. Richards
By
Chas. E. Lord
Attorney

UNITED STATES PATENT OFFICE.

WALTER J. RICHARDS, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

DYNAMO-ELECTRIC MACHINE.

No. 854,704.   Specification of Letters Patent.   Patented May 21, 1907.

Application filed August 27, 1906. Serial No. 332,087.

*To all whom it may concern:*

Be it known that I, WALTER J. RICHARDS, a citizen of the United States, residing at Norwood, in the county of Hamilton and State of Ohio, have invented certain new and useful Improvements in Dynamo-Electric Machines, of which the following is a full, clear, and exact specification.

My invention relates to dynamo-electric machines provided with means for preventing sparking at the commutators.

Anti-sparking windings for dynamo-electric machines are usually connected in series with the armature so that the current variations in them and in the armature are proportional. However, it is sometimes desirable that the current in the anti-sparking windings vary in a different ratio from the current in the armature, and this is especially so when the machine is being operated near its maximum load, where due to the knee in the saturation curve the effective magnetization due to the anti-sparking winding rises more slowly than the current. For this reason in order to have the spark-reducing magnetization vary in proportion to the armature current, it is desirable to have the current in the anti-sparking windings vary proportionately more rapidly than the armature current, and this my invention is intended to accomplish. And it is sometimes desirable to have this magnetization vary in some other than direct proportion with the armature current. This also can be accomplished by my invention. If desired my invention can also be applied to distributed compensating windings, though it is here especially described in connection with concentrated commutating windings wound on auxiliary poles.

In one aspect my invention consists of a dynamo-electric machine having main and anti-sparking field windings, and means for causing the current in the anti-sparking winding to vary in greater proportion than the main current.

In a more specific aspect my invention consists of a dynamo-electric machine comprising an armature, a main field winding, and a commutating winding in series with the armature, and resistances in series and in shunt respectively to the commutating winding and arranged to be varied with the variation in the main current to cause the current in the commutating winding to rise and fall proportionately more rapidly than the current in the armature winding.

Other features of my invention will appear from the description and drawings and will be particularly pointed out in the claims.

Figure 1 is a view showing one embodiment of my invention; and Figs. 2, 3 and 4 are simple diagrams showing modifications.

Referring first to Fig. 1, 10 is the armature and 11 the field frame of a dynamo-electric machine. The field frame carries main poles 12 and 13 and auxiliary poles 14 and 15. These auxiliary poles are now commonly known as commutating poles and serve to reverse the current in the armature coil undergoing commutation in a manner so well known that no explanation of their action is here necessary. On the main field poles 12 and 13 is the main field winding 16, here shown as a shunt winding and as being adjustable by the rheostat 17. On the commutating poles is a series winding 18. This winding has in series therewith a resistance 19 of carbon or other material having a negative temperature coefficient of resistance, while in shunt to the winding 18 and the resistance 19 is a resistance 20 of iron or other material having a positive temperature coefficient of resistance. If desired, the resistances 19 and 20 may be made of materials which both have either positive or negative temperature coefficients of resistances, it being only necessary that this coefficient of the resistance 19 be algebraically less than that of the resistance 20. The resistance 20 is shown as adjustable.

The operation of the arrangement shown in Fig. 1 is as follows:—Upon a rise in current the resistances 19 and 20 are heated whereupon the resistance of 19 decreases and that of 20 increases and that branch of the circuit containing the resistance 19 and commutating winding 18 takes a larger share of the whole current than it previously had and the branch which contains the resistance 20 takes a smaller share thereof. The current in the commutating winding 18 thus rises in greater ratio than the main or armature current, causing the magnetization of the auxiliary poles 14 and 15, by reason of the knee in their magnetization curve, to increase in approximately the same ratio as the main current. By properly adjusting the resistances 19 and 20 the magnetization of these auxiliary poles may be made to increase in the same ratio as the main current, or in a greater or less ratio as desired.

In the modification shown in Fig. 2 the main field winding $16^a$ is in series with the armature $10^a$ and is adjustable by means of the resistance $17^a$ in shunt to it instead of in series with it as in Fig. 1. The commutating winding $18^a$ is in series with the armature, and its terminals are connected to the terminals of a resistance 21. From a variable intermediate point of the resistance, the current proceeds through the arm 22 and the solenoid 23 to the line. Upon an increase in the current the solenoid 23 which carries the full armature current draws the arm 22 to the right and decreases the portion of the resistance 21 in series with the commutating winding $18^a$ and increases the portion in shunt thereto, thus increasing the proportionate part of the main current which flows through the commutating winding. The action of the solenoid 23 on the arm 22 is opposed by a spring 24 which on decrease of current draws the arm 22 to the left to cause the ratio between the current in the commutating winding and the main current to decrease.

In Fig. 3 the main field winding $16^b$ is in shunt to the armature, as in Fig. 1, and is adjustable by means of the variable resistance $17^b$. The armature $10^b$ has in series therewith the commutating winding $18^b$. This winding is in series with a pile of carbon blocks 25. In shunt to the winding $18^b$ and the carbon blocks 25 is a resistance 26 which may be adjustable, but after adjustment may remain approximately constant or may vary as the current through it varies. Upon a rise in the armature current the solenoid 27 compresses the pile of carbon blocks 25 and causes a greater part of the main current to flow through the commutating winding $18^b$, thus varying the strength of the commutating poles in approximate proportion to the main current. In Fig. 3 when the device is used as a motor, the solenoid 27 carries only the armature current, as the variation in the field current does not directly require a variation in the commutating pole strength as do the controlling means in Figs. 2 and 4.

In Fig. 4, as in Figs. 1 and 3, the main field winding $16^c$ is a shunt winding and is adjustable by a rheostat $17^c$. In this figure, however, the main field winding is connected directly in shunt to the armature $10^c$. The commutating winding $18^c$ has in series therewith a pile of carbon blocks 28 and in shunt thereto the adjustable resistance 29. The parts of the total current which pass through the branches of the circuit $18^c$ and 28, and 29, rejoin at 30, and continue through a resistance bar 31. The bar 31 and the carbon blocks 28 are held in a frame 32 but insulated therefrom. Upon an increase in current, the resistance bar 31 is heated and expands, thus compressing the pile of carbon blocks 28 so that the branch including the commutating winding $18^c$ carries a greater share of the total main current.

My invention is applicable to both generators and motors. When used in a motor a starting resistance 33 may be used as indicated in Fig. 3.

Instead of using a commutating winding, other forms of anti-sparking windings may be used. This and many other modifications may be made in the specific structure here shown and described, and in the following claims I aim to cover all such which fall within the spirit and scope of my invention.

What I claim is:—

1. A dynamo-electric machine having main and commutating windings, and means for causing the current strength in the commutating windings to vary in greater proportion than the main current.

2. In a dynamo-electric machine, an armature, main and commutating windings, and resistances in shunt and in series respectively to the commutating winding.

3. In a dynamo-electric machine, an armature, main and commutating windings, and resistances in shunt and in series respectively to the commutating winding and arranged to be varied to cause the current in the commutating winding to vary in greater ratio than the main current.

4. In a dynamo-electric machine, the combination of main and anti-sparking windings, and a shunt about the anti-sparking winding which increases in resistance as the main current rises.

5. A dynamo-electric machine having main and anti-sparking windings, and means for automatically diverting current from the anti-sparking winding at a rate less than the rate of variation of load on the machine.

6. A dynamo-electric machine having main and commutating field coils, and means for automatically varying the current passing through the commutating coil at a rate greater than the rate of change of load on the machine.

7. In combination, a dynamo-electric machine having a commutating winding, a resistance in series with the commutating winding thereof, and a shunt about said commutating winding and resistance.

8. In combination, a dynamo-electric machine having an anti-sparking winding, a variable resistance in series with said anti-sparking winding, and a shunt about said anti-sparking winding and resistance.

9. In combination, a dynamo-electric machine having an anti-sparking winding, an automatically variable resistance in series with the anti-sparking winding thereof, and an adjustable shunt around said anti-sparking winding and resistance.

10. In combination, a dynamo-electric machine provided with a commutating winding, a resistance in series with the commutating winding thereof which automatically decreases upon an increase of the main current, and a shunt about said commutating winding and resistance.

11. The combination with a dynamo-electric machine having a commutating winding, of a resistance in series with the commutating winding thereof, and a shunt about said commutating winding and resistance which automatically increases in resistance value with an increase in the main current.

12. The combination of a dynamo-electric machine having an anti-sparking winding, a resistance in series with the anti-sparking winding thereof which automatically decreases upon an increase of the main current, and a shunt about said anti-sparking winding and resistance which automatically increases in resistance value with an increase in the main current.

13. In combination, a dynamo-electric machine having an anti-sparking winding, and means for varying the current in said anti-sparking winding in a ratio different from that of the main current.

14. A dynamo-electric machine having main and commutating field windings, and means for causing the ratio between the current in the armature and that in the commutating winding to vary as the armature current varies.

15. A dynamo-electric machine having main and commutating field windings, and means for decreasing the ratio between the current in the armature and that in the commutating winding as the armature current increases.

16. A dynamo-electric machine having main and anti-sparking field windings, and means for decreasing the ratio between the current in the anti-sparking winding and that in the armature as the armature current decreases.

17. A dynamo-electric machine having main and anti-sparking field windings, and means for automatically varying the proportionate part of the main current taken by the anti-sparking winding.

18. A dynamo-electric machine having main and anti-sparking field windings, and means for automatically increasing the proportionate part of the main current taken by the anti-sparking winding as the load increases.

19. A dynamo-electric machine having main and commutating field windings, and means for automatically decreasing the proportionate part of the main current taken by the commutating winding as the current load decreases.

20. A dynamo-electric machine having main and anti-sparking windings, and means for causing the current in the anti-sparking winding to vary proportionately more rapidly than the main current.

21. A dynamo-electric machine having main and anti-sparking windings, and means for increasing the rate of change of current in the anti-sparking winding as the armature current increases.

22. A dynamo-electric machine having main and commutating field windings, and means for decreasing the rate of change of current in the commutating winding as the main current decreases.

In testimony whereof I affix my signature, in the presence of two witnesses.

WALTER J. RICHARDS.

Witnesses:
RUBY ROBINSON,
FRED J. KINSEY.